3,444,233
PREPARATION OF ALKYL AND ARYL
ALPHA-CYANOACRYLATES
Robert Rabinowitz, Stamford, Conn., assignor to American Cyanamid Company, Stamford, Conn., a corporation of Maine
No Drawing. Filed Aug. 26, 1966, Ser. No. 575,234
Int. Cl. C07c 121/02
U.S. Cl. 260—465                                              6 Claims

ABSTRACT OF THE DISCLOSURE

A process for producing monomeric alpha-cyanoacrylates from a cyanoacetate and formaldehyde in a two-step procedure. In the first step, the cyanoacetate and formaldehyde are polymerized in a non-aqueous solution in the presence of a condensation catalyst and a high boiling liquid phosphate or phosphonate. Upon completoin of the polymerization, the polymeric mixture containing the phosphate or phosphonate is then thermally depolymerized. The phosphate or phosphonate is represented by the formula:

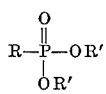

wherein R' is alkyl of 1–18 carbons, aryl of 1–3 rings or aralkyl of 1–3 rings and up to 32 carbons; and R is either R' or OR'.

---

This invention relates to the preparation of cyanoacrylate compositions. More particularly, it relates to the preparation of alpha-cyanoacrylates suitable for use in adhesive compositions. Still more particularly, this invention relates to an improved method of forming monomeric alpha-cyanoacrylates wherein cyanoacetate and formaldehyde (or a formaldehyde generating material) are polymerized to poly(cyanoacrylates) in the presence of a solvent which has a boiling point greater than the temperature at which the polymer thermally decomposes to the desired monomeric alpha-cyanoacrylate.

The conventional method for obtaining monomeric alpha-cyanoacrylates involves a two-step procedure wherein a cyanoacetate is reacted with formaldehyde in the presence of a condensation catalyst to give poly(alpha-cyanoacrylate); and the polymer is depolymerized, normally by thermal means to the desired monomeric alpha-cyanoacrylate. This fundamental procedure is described in U.S. Patent 2,467,927, issued Apr. 19, 1949, to Ardis. While the reaction between formaldehyde and cyanoacetate can be carried out without the use of an added solvent since the formaldehyde starting material is liquid under reaction conditions, it has been found to be more desirable to use a solvent during the polymerization reaction. Normally these solvents have been relatively low boiling liquids. In fact, in U.S. Patent 2,721,858, there is disclosed a method of preparing monomeric alpha-cyanoacrylates which specifically calls for the presence of a solvent during the reaction of the formaldehyde and the alpha-cyanoacetate, which solvent must be capable of being distilled at a temperature below the temperature at which the polymer is depolymerized. The purpose of using such a low boiling solvent, according to the patentee, is to enable the azeotropic distillation of water and said low boiling solvent before the polymer is depolymerized.

Similarly, the usefulness of a high boiling liquid during the second stage in the preparation of monomeric alpha-cyanoacrylates, i.e., during depolymerization of polymeric cyanoacrylate, has been recognized. Thus, there is disclosed in U.S. Patent 2,756,251, the use of a phosphate which boils at a temperature above the depolymerization temperature of the polymeric material. The high boiling material has the effect of improving heat transfer within the depolymerization reaction mixture and thus, advantageously, lowers the temperature to which the polymer mass must be heated before depolymerization occurs.

Thus, until the present invention, it has been necessary to use one type of liquid during the polymerization of formaldehyde and cyanoacetate and another type of liquid to effectively depolymerize the resulting polymer. Aside from the economic disadvantage of having to use two solvents as above noted, there are other disadvantages which would be desirably avoided. When the high boiling solvent must be added to the polymeric material which is to be depolymerized, some difficulty is encountered in obtaining a homogeneous blend with the relatively thick polymer. Furthermore, the step of adding the high boiling solvent is a time-consuming one and may lower the over-all efficiency of the cyanoacrylate preparation.

It is an object of the present invention to provide a process of obtaining monomeric alpha-cyanoacrylates whereby both the polymerization and depolymerization reactions can be efficiently accomplished without the necessity of using a different solvent in each step. It is a further object of the present invention to provide a method whereby the difficulties of blending the high boiling solvent into the polymer are avoided. Other objects will be apparent upon reading the ensuing description of the present invention.

In accordance with the present invention, it has been discovered that high boiling liquid phosphates and phosphonates of a certain class, can be employed an solvents both during the formation of polymeric alpha-cyanoacrylate and the depolymerization of poly(alpha-cyanoacrylate). When monomeric alpha-cyanoacrylate is prepared in accordance with the present invention, certain important advantages are gained. It is not necessary to add a low boiling solvent during the reaction of formaldehyde and alpha-cyanoacetate. Moreover, the difficulties involved in blending a high boiling solvent with poly(alpha-cyanoacrylate) are avoided since the high boiling solvent is present during the formation of the polymer and in effect the polymer is dissolved or dispersed in the solvent in situ.

To practice the present invention, a suitable cyanoacetate is reacted with formaldehyde at a temperature of 50°–100° C. in the presence of a high boiling solvent, as will be hereinafter more particularly defined. The reaction is conducted in the presence of a condensation catalyst. After a suitable reaction period at elevated temperatures, the resulting poly(alpha-cyanoacrylate) is heated to drive off as much moisture as possible. The removal of as much water as possible is necessary before the product is depolymerized. If necessary or desired, the removal of water may be aided by the addition at this point of a liquid which forms an azeotrope with water. This liquid is not necessarily a solvent for monomeric or polymeric alpha-cyanoacrylate or the starting materials therefor. When the water content of the polymer has been reduced to the desired level, the polymeric material, dissolved or dispersed in the high boiling liquid, is then in condition for depolymerization. Depolymerization is effected by heating the polymer, already under reduced pressure, to a temperature in the order of 100–200° C. The depolymerization is greatly facilitated by the presence of a polymerization inhibitor and phosphoric anhydride. The product monomeric alpha-cyanoacrylate is collected in the distillate from the depolymerization mixture.

The solvent materials which are used in accordance with the present invention during both polymerization and depolymerization are inert liquid phosphates or phosphonates having a boiling point above the temperature at which the particular polymeric(alpha-cyanoacrylate) depolymerizes. Such materials are represented by the following Formula I:

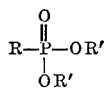

$$R-\underset{\underset{OR'}{|}}{\overset{\overset{O}{\|}}{P}}-OR' \qquad I$$

wherein R' is either alkyl of 1-18 carbons, aryl of 1-3 rings or aralkyl of 1-3 rings and up to 32 carbons; and R is either R' or OR'. Preferred materials within the scope of Formula I are those liquids wherein R and R' are aryl radicals, preferably either unsubstituted phenyl groups or phenyl groups substituted with lower alkyl or hydroxy radicals. The aryl derivatives of Formula I are preferred for reason of their generally higher boiling temperatures and consequent ease of separation from the final alpha-cyanoacrylate product. Examples of such aryl phosphates and phosphonates are diphenyl phenylphosphonate, di-(p-tolyl) phenylphosphonate, ditolyl tolylphosphonate, triphenylphosphate, trinaphthylphosphate and tricresylphosphate.

Generally, at least about 10% of the high boiling liquid should be present in the reaction mixture on the basis of the weight of the whole reaction mixture including said liquid. It is preferred, however, for greater effectiveness, to add at least 20% by weight to the reaction mixture. Useful results are obtained by conducting the reaction in a mixture which is composed of about 80% by weight of high boiling liquid as above defined. While there is no purpose served in adding more than 80% to the reaction mixture, more liquid may be used without interfering with the reaction although the reaction time may be increased due to the resulting high state of dilution.

The reaction between the cyanoacetate and the formaldehyde is carried out in a solution of the high boiling liquid of Formula I and in the presence of a condensation catalyst. This polymerization reaction involves the condensation of equimolar amounts of the reactants. It is advisable to charge equimolar amounts of the reacting materials into the reaction vessel; however, variations of reactant concentrations do not affect the ultimate formation of poly(alpha-cyanoacrylates) and, thus, it is permissible to use an excess of either reactant. Formaldehyde may be supplied to the reaction by use of either formaldehyde itself or a formaldehyde generating material such as paraformaldehyde and polymers thereof. In this disclosure, the term "formaldehyde" is intended to mean any of these equivalent materials.

The condensation catalysts which are useful in the reaction between the cyanoacetate and the formaldehyde can be any organic or inorganic basic material including alkali metal hydroxides (e.g., sodium hydroxide), ammonia, ammonium hydroxide, quinoline, piperidine, alkylamines (e.g., dimethylamine and diethylamine) and alkali metal alkoxides (e.g., sodium methoxide). The amount of the catalyst is not critical to the operation of the condensation reaction and anywhere from 0.001 to 0.5 molar percent based on the reactants is sufficient.

Aryl, aralkyl or alkyl esters of cyanoacetic acid can be used in the reaction with the formaldehyde material. The alkyl groups in such esters may have from one to eighteen carbon atoms and the aryl groups may be monocyclic, bicyclic or tricyclic. Aryl groups may bear substituents which do not react with formaldehyde, e.g. lower alkyl and lower alkoxy groups. The aralkyl groups are most desirably monocyclic lower alkyl radicals. Examples of suitable cyanoacetates are the alkyl cyanoacetates such as methyl cyanoacetate, ethyl cyanoacetate, propyl cyanoacetate, cyclohexyl cyanoacetate and heptyl cyanoacetate; the aryl esters such as phenyl cyanoacetate and p-tolyl cyanoacetate; and the aralkyl esters such as benzyl cyanoacetate and beta-phenylethyl cyanoacetate.

After the reaction has proceeded for several hours, the resulting reaction product containing polymerized alpha-cyanoacrylate must be treated to remove water which is produced during the condensation reaction. This can be accomplished to a large extent by heating the polymer in an oven at a temperature up to about 100° C. under reduced pressure. Water content of the polymer can be reduced in this manner to a concentration of less than about one-half percent after prolonged heating. If it is desired to hasten the removal of moisture, this can be done by the addition of a liquid which forms an azeotrope with water and the subsequent distillation of the azeotrope. Among such materials are benzene, toluene, cyclohexane and other common organic solvents which form azeotropes with water.

The removal of water from the poly(alpha-cyanoacrylate) yields a polymeric product which can be depolymerized to give the desired monomeric alpha-cyanoacrylate. Depolymerization is effected in the case of the present invention without the need of adding a heat transfer diluent at this point of the process, since advantageously the diluent was previously added as a solvent for the initial polymerization reaction. Depolymerization is effected by heating to temperatures of about 125-200° C. under reduced pressure. Depolymerization is facilitated by the addition of a polymerization inhibitor to counteract the tendency of the monomeric cyanoacrylate to repolymerize. Any acidic inhibiting substance may be used including phosphorus pentoxide, antimony pentoxide, sulfur dioxide, nitric oxide, hydrogen fluoride, and the like, to prevent anionic polymerization. Additionally, it is desirable to add a free-radical polymerization inhibitor such as hydroquinone or t-butyl catechol. Heating to effect thermal depolymerization is preferably done in a distillation apparatus so that the product monomeric alpha-cyanoacrylate is collected in the distillate and the high boiling inert liquid used in accordance with the present invention remains in the distillation pot. Distilled monomeric alpha-cyanoacrylate may be stabilized by the presence in the reaction vessel of a suitable polymerization inhibitor as above described.

The following examples are presented to further illustrate the present invention.

Example 1.—Preparation of methyl alpha-cyanoacrylate using diphenyl phenylphosphonate as solvent 101 g. of methyl cyanoacrylate, 30 g. of paraformaldehyde and 50 g. of diphenyl phenylphosphonate were heated to 85° C. Then 0.2 ml. of piperidine was added and an exothermic reaction occurred. The temperature was maintained at 100° C. with external cooling. After the temperature dropped, the reaction mixture was maintained at 100° C. by heating for one hour in order to insure complete reaction. Then 100 ml. of toluene was added and azeotropic distillation with the aid of a Dean Stark trap was begun. Although all of the 18 g. of water was removed after one hour, the distillation was allowed to proceed for an additional 7 hours. Then 5.0 g. of $P_2O_5$ and 3.5 g. of hydroquinone were added the toluene removed in vacuo and the residual material heated at 150-195° C. at 2.8 mm. in the presence of $SO_2$. A total of 56 g. of methyl alpha-cyanoacrylate was obtained.

Example 2.—Synthesis of ethyl alpha-cyanoacrylate using diphenyl phenylphosphonate as solvent The following materials were mixed and heated to 85° C.: 50 g. of diphenyl phenylphosphonate, 115.4 g. of ethyl cyanoacetate, and 30 g. of paraformaldehyde. Then 0.2 ml. of piperidine was added and the reaction mixture behaved and was handled essentially in the same manner as in Example 1. A total of 87.4 g. of ethyl alpha-cyanoacrylate was obtained.

Example 3.—Preparation of n-hexyl alpha-cyanoacrylate using diphenyl phenylphosphonate as solvent The following were mixed and heated to 85° C.: 177.5 g. of n-hexyl cyanoacetate, 30 g. of paraformaldehyde, and 50 g. of diphenyl phenylphosphonate. Then 0.2 ml. of piperidine was added and the reaction mixture handled in essentially the same manner as in Example 1. A total of 105 g. of n-hexyl alpha-cyanoacrylate was obtained.

Example 4.—Preparation of cyclopentyl alpha-cyanoacrylate using tritolylphosphate as solvent A mixture of 81.5 g. of cyclopentyl cyanoacetate, 15.8 g. of paraformaldehyde and 75 ml. of tritolylphosphate was heated to 75° C. Then 0.15 ml. of piperidine was added. The reaction mixture was handled essentially in the same manner as in Example 1. A total of 35 g. of cyclopentyl alpha-cyanoacrylate was obtained.

Example 5.—Preparation of n-octyl alpha-cyanoacrylate using tritolylphosphate as a solvent A mixture of 100 g. of n-octyl cyanoacetate, 16.8 g. of paraformaldehyde, and 100 g. of tritolylphosphate was heated to 60° C. Then 0.2 ml. of piperidine was added and the mixture maintained at 75° C. for 3½ hours to insure complete reaction. Then 100 ml. of benzene was added and azeotropic distillation was begun with the aid of a Dean Stark trap. Seven ml. of water was separated. Then 5 g. of $P_2O_5$ and 3.5 g. of hydroquinone were added the benzene vacuum stripped and the residual material heated up to 220° C. at 0.4 mm. in the presence of gaseous $SO_2$. A total of 66 g. of n-octyl alpha-cyanoacrylate was obtained.

Example 6.—Preparation of methyl alpha-cyanoacrylate 111 g. of methyl cyanoacetate, 30 g. of paraformaldehyde and 50 g. of the still residue from the depolymerization in Example I, consisting largely of diphenyl phenylphosphonate, were heated to 88° C.; then 0.2 ml. of piperidine was added. An exothermic reaction occurred. The temperature was maintained at about 100° C. by external cooling. After the temperature dropped, the reaction mixture was maintained at 98° C. by heating for 1 hour in order to insure complete reaction. Then 100 ml. of toluene was added and azeotropic distillation was begun. During the first 3 hours, 19 ml. of water was removed; the distillation was continued for an additional 5 hours; then 5.0 g. of $P_2O_5$, and 3.5 g. of hydroquinone were added, the toluene removed in vacuo. The mixture remaining was heated to depolymerize between 146-200° C. at 2.5 mm. A total of 67.1 g. of methyl alpha-cyanoacrylate was obtained.

This example shows that the diphenyl phenylphosphonate solvent can be reused directly after one run is finished. Some dark residue remains.

Alternatively, the diphenyl phenylphosphonate, may be diluted with heptane, the mixture heated to boiling, and after the phosphonate dissolves, the heptane layer is decanted. Upon cooling the diphenyl phenylphosphonate crystallizes out, and is collected by filtration, and reused in a subsequent run.

Example 7.—Preparation of n-pentyl alpha-cyanoacrylate

A mixture of 167 g. of n-pentyl cyanoacetate, 30 g. of paraformaldehyde and 100 g. of diphenyl phenylphosphonate was heated to 83° C. Then 0.2 ml. of piperidine was added. The reaction mixture was quickly brought to 100° C. where it was maintained for 1 hr. The formed water was then removed by distilling in vacuo while slowly raising the temperature to 130° C. Then the temperature was adjusted to 100° C., 7.5 g. of $P_2O_5$ was added, and the system stirred for 1 hr. The reaction mixture was then heated to 202° C. under a Vigreaux distillation column at 1 mm. pressure. Signs of depolymerization appeared at about 150° C.; distillation started at a pot temperature of about 180° C. Twenty-four grams of n-pentyl alpha-cyanoacrylate was obtained.

I claim:
1. In the process for the preparation of monomeric alpha-cyanoacrylates by the polymerization of (a) an alkyl, aralkyl or aryl cyanoacetate and (b) formaldehyde at an elevated temperature in the presence of a condensation catalyst and the subsequent removal of water from, and thermal depolymerization of, the resulting polymer to yield the desired monomeric alpha-cyanoacrylate, the improvement which comprises polymerizing a mixture of the cyanoacetate and formaldehyde in a high boiling liquid phosphate or phosphonate of the formula:

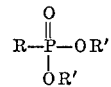

wherein R' is alkyl of 1–18 carbons, carbocyclic aryl of 1–3 rings or carbocyclic aralkyl of 1–3 rings and up to 32 carbons; and R is either R' or OR', said high boiling liquid composing at least 10% by weight of the polymerization mixture.

2. The process of claim 1 wherein R and each R' are phenyl.

3. The process of claim 1 wherein R and each R' are tolyl.

4. The process of claim 1 wherein R is tolyloxy and each R' is tolyl.

5. The process of claim 1 wherein the polymerization mixture is composed of 10–80% of the high boiling liquid.

6. The process of claim 1 wherein the high boiling liquid is reused in a subsequent similar polymerization and depolymerization sequence.

References Cited

UNITED STATES PATENTS 2,756,251  7/1956  Joyner et al. ____ 260—464 XR
2,784,215  3/1957  Joyner et al. _____ 260—465.4

JOSEPH P. BRUST, *Primary Examiner.*

U.S. Cl. X.R.

260—464, 465.4